Patented Apr. 5, 1949

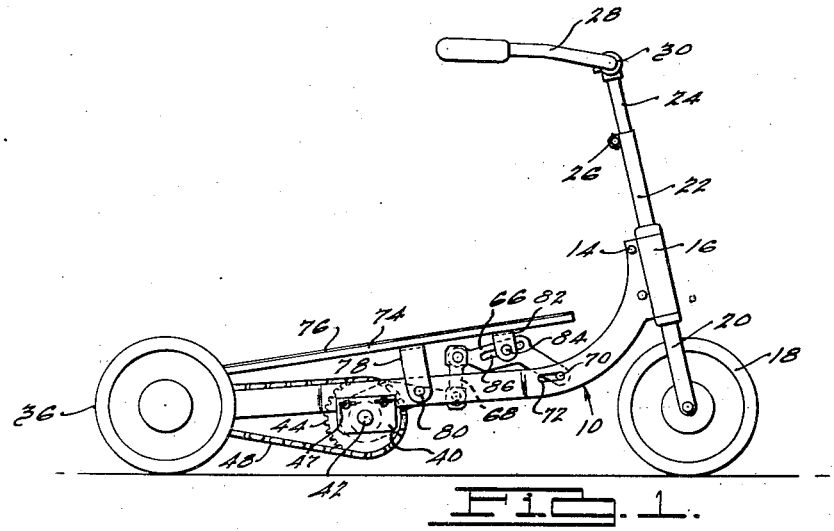

2,466,105

UNITED STATES PATENT OFFICE 2,466,105

TREADLE SCOOTER

Joseph Q. Hoffman, Detroit, Mich.

Application May 6, 1946, Serial No. 667,566

1 Claim. (Cl. 280—221)

This invention relates to scooters and more particularly to an improved driving mechanism for treadle type scooters.

My invention is designed to provide a treadle scooter which has an improved driving mechanism having a simple and sturdy construction which may be economically manufactured and assembled. It is also an object of my invention to provide a treadle scooter having an improved coaster clutch and clutch linkage of highly durable construction.

My invention is illustrated in connection with a three wheeled scooter of the treadle type, however, it will be understood that it may be used with various types of scooters including two wheel scooters.

For a better understanding of the invention, reference may be had to the drawings wherein:

Figure 1 is a side elevational view of a scooter embodying my invention;

Figure 2 is a plan view of the scooter shown in Figure 1;

Figure 3 is a cross sectional view taken on the line 3—3 of Figure 2; and

Figure 4 is a cross-sectional view taken on the line 4—4 of Figure 3.

Referring to the drawings, the scooter has a frame 10 comprising a pair of metal bars 12 extending along opposite sides of the scooter and the forward ends of which are secured by bolts 14 to a radially projecting boss formed on the sleeve 16. The front wheel 18 is rotatably mounted in a fork 20 having an upwardly extending tubular shaft 22 journaled in the sleeve 16. A handle bar supporting shaft 24 is received in the upper end of the tubular shaft 22 which is slotted and provided with a bolt 26 for clamping the upper end of the tubular shaft 22 about the handle bar shaft 24 to secure it in any desired adjusted position. A bicycle-type handle bar 28 is mounted in the clamp 30 provided on the upper end of the shaft 24. The clamp 30 may be loosened to permit the handle bar 28 to be pivoted to any desired position. This construction permits the handle bar to be adjusted to the proper position for riders of widely differing sizes.

A rear axle 32 is journaled in the rear ends of the frame members 12. The rear ends of frame members 12 in which the axle 32 is journaled are held in spaced relation by shoulders 34 integrally formed on the axle. The axle 32 carries two rear wheels 36, one of which is keyed thereto and the other of which is rotatably mounted thereon to afford a differential action. A chain sprocket wheel 38 is keyed to the rear axle 32 between the shoulders 34.

A pair of opposed depending hangers 40 are mounted on the frame 10 forwardly of the rear axle 32 and a rotatable shaft 42 extending transversely of the frame 10 is journaled therein. A chain sprocket wheel 44, of substantially greater diameter than the sprocket 38, is keyed to the shaft 42 by a set screw 46. The rear axle 32 is driven through sprocket 44, chain 48 and sprocket 38. The brackets 40 are adjustably mounted on the frame 10 so that the tension of the chain 48 may be adjusted, by providing slots 41 in the brackets 40 through which the ends of the securing bolts 45 extend and to which they are secured by nuts 49. Chain tension is adjusted by loosening nuts 49 and shifting brackets 40 forwardly or rearwardly relative to frame members 12 as desired.

The shaft 42 has an enlarged portion 50 integrally formed thereon which is engaged by a clutch collar 52 having a cylindrical bore 54 therein adapted to fit the shaft 50 and permit free relative rotation therebetween. A small cylindrical passage 56 is formed in the clutch collar 52 tangentially of the bore 54 and communicates therewith. A small steel ball 58, of such size as to permit free movement along the passage 56, is disposed within said passage and biased toward a restricted opening at the inner end of the passage 56 by a spring 60, one end of which engages the ball 58 and the other end of which engages a set screw 62 threaded in the outer end of the passage 56 to retain the spring and adjust its tension. The end of the passage 56 at the bore 54 is restricted to prevent the ball from falling out when the clutch collar is removed from the shaft.

When the clutch collar 52 is rotated in a clockwise direction relative to the shaft 50, as viewed in Figure 4, the ball 58 is moved toward the inner end of the passage 56 by the action of the spring 60 and protrudes slightly into the bore 54 of the collar 52 where it becomes frictionally bound or wedged between the end wall of passage 56 in the collar and the surface of the shaft 50 thereby causing the shaft 50 to rotate in the clockwise direction with the clutch collar 52. The ball 58 remains wedged in this position causing the clutch collar 52 and the shaft to turn as a unit so long as there is a force exerted on the clutch collar 52 tending to rotate it in a clockwise direction.

When the clutch moves in a counterclockwise direction relative to the shaft, as viewed in Figure 4, the friction between the shaft and the ball 58 urges the ball inward in the passage 56 against the pressure of the spring 60 to a position which permits the shaft 50 to turn freely relative to clutch collar 52.

It will be understood that this counterclockwise rotation of the clutch relative to the shank 52 may result either from an actual movement of the clutch 52 in a counterclockwise direction or when the shaft rotates in a clockwise direction faster than the clutch collar. This clutch construction permits coasting action of the scooter.

The clutch collar 52 is operated to drive the shaft 50 and the scooter by means of a forwardly extending arm 64 integral with the collar 52, the forward end of which is connected to the rearwardly extending end of a rocking lever 66 by a link rod 68 pivotally connected at its respective ends to the end of the clutch collar arm 64 and the rocking lever 66. The forward end of the lever 66 carries a transversely extending pin 70 which pivotally and slidably engages the frame 10 in generally horizontal slots 72 formed therein.

For actuating the lever 66 a treadle 74 having a rubber mat 76 on its upper surface, is disposed above the frame 10 and pivotally connected thereto by a depending U-shaped bracket 78 and pins 80 which each pivotally secure an end of the bracket 78 to one of the frame members 12. Spaced forwardly of the bracket 78 the treadle 74 carries a depending bracket 82 mounting a transversely disposed pin 84 which engages the arm 66 in a slot 86 formed intermediate its ends.

My scooter construction described above operates in the following manner. The rider stands on the treadle 74 with one foot rearwardly of its pivotal connection to the frame 10 and one foot forwardly thereof. To start the scooter, pressure is applied to the forward end of the treadle. This causes the rocking lever 66 to pivot about the pin 70 as a result of the pressure transmitted through bracket 82 and pin 84 carried on the treadle 74. This causes the rearwardly extending end of rocking lever 66 and the generally vertically disposed link 68 connected thereto to move the clutch arm 64 downwardly as viewed in Figure 4, which causes rotation of the clutch collar 52 and shaft 42 as described. When the treadle has moved to the limit of its stroke the rider applies pressure to the treadle rearwardly of its pivotal connection to the frame and the pin 84 acts to lift the rocking lever 66 and rotate clutch collar 52 in the opposite direction permitting the shaft 42 to overrun as described.

It will be appreciated that the rider may stand with one foot on the treadle and push on the ground with the other foot in the conventional manner employed in operating scooters, and the clutch will act as a coaster clutch so long as shaft 42 overruns clutch collar 52.

Although only one specific embodiment of the invention has been illustrated and described in detail, it will be apparent to those skilled in the art that various modifications and changes may be made without departing from the spirit of the invention and from the scope of the appended claim.

What is claimed is:

In a scooter, a frame, a drive shaft rotatably mounted on said frame and operable to propel said scooter, a treadle pivotally mounted on said frame, a clutch collar having a bore therein rotatably receiving said drive shaft and having a passage therein disposed tangentially of said bore and communicating therewith, a ball disposed within said passage and movable into and out of a position of wedging engagement with said shaft, a spring resiliently urging said ball toward said position, said clutch collar having a generally radially outwardly extending arm, a generally vertically disposed link rod having one end pivotally connected to said arm, and a rocking lever having one end pivotally connected to the other end of said rod and its other end pivotally and slidably connected to said frame, and said rocking lever intermediate its ends being pivotally and slidably connected to said treadle in spaced relation to the latter's pivotal connection to said frame.

JOSEPH Q. HOFFMAN.

REFERENCES CITED

The following references are of record in the file of this patent:

UNITED STATES PATENTS

| Number | Name | Date |
| --- | --- | --- |
| 342,586 | Deissler | May 25, 1886 |
| 1,249,407 | Imlay | Dec. 11, 1917 |
| 2,251,005 | Rubinich | July 29, 1941 |